United States Patent [19]

Dellas

[11] Patent Number: 5,224,273
[45] Date of Patent: Jul. 6, 1993

[54] BEARING CLEARANCE MEASUREMENT

[75] Inventor: Athanasios Dellas, Bristol, Conn.

[73] Assignee: United Technologies Corporation, Hartford, Conn.

[21] Appl. No.: 706,448

[22] Filed: May 28, 1991

[51] Int. Cl.⁵ .............................................. G01B 1/00
[52] U.S. Cl. ...................................................... 33/517
[58] Field of Search ................. 73/865.8, 865.9, 118.1; 33/517

[56] References Cited

U.S. PATENT DOCUMENTS

2,942,350  6/1960  Sloan ..................................... 33/517
3,279,083 10/1966  Remington ........................... 33/517

*Primary Examiner*—Robert Raevis
*Attorney, Agent, or Firm*—Richard H. Kosakowski

[57] ABSTRACT

The diametral clearance of an aperture of a bearing is measured by an apparatus which includes a mounting for placing both the bearing and an associate pivot in axial relation with each other along an axis of alignment and positioning devices for positioning the pivot in relation to the bearing. The positioning devices include axial direction positioning devices for adjusting the pivot in each of two mutually perpendicular axial directions transverse to the axis of alignment to locate an approximate center of bearing clearance and for adjusting the pivot from the approximate center of bearing clearance in each of the mutually perpendicular axial directions until the pivot displaces the bearing in the corresponding direction. Also included are gaging devices for measuring any movement of both the bearing and pivot in each of the mutually perpendicular axial directions, and an indicator for indicating any axial movement of the bearing and the pivot while the positioning devices adjust the pivot in each of the two mutually perpendicular axial directions.

12 Claims, 5 Drawing Sheets

BEARING CLEARANCE MEASUREMENT

DESCRIPTION

1. Technical Field

This invention relates to bearing clearance measurement, and more particularly to such measurement in high-accuracy, close tolerance, precision gyroscope bearings.

2. Background Art

Advanced generation gyroscopes ("gyros"), such as the Hamilton Standard Model RI-1010 single degree of freedom, floated, rate-integrated gyro, require parts having closer tolerances than previous generation gyros. These tolerances translate to higher accuracy gyros. In particular, an output axis suspension bearing and associated pivot require diametral clearance therebetween on the order of 5 to 10 microinches. This compares to clearances of about 200 microinches in previous generation gyros.

This bearing clearance cannot be measured to within the required accuracy of 5 to 10 microinches using known measuring techniques. Because of this, the bearings and pivots are currently tested by completely assembling a gyro, and then operating the gyro to determine if the clearance in the bearings is within an acceptable level. If the bearing and/or pivot is found to be defective the gyro must be disassembled and reassembled with a new bearing and/or pivot. However, this operational testing is very expensive and inefficient because of the large amount of time required to assemble and disassemble the gyro, along with the observed high rate of bearing and pivot pairs that produce unacceptable operation.

DISCLOSURE OF INVENTION

Objects of the present invention include provision of a method and apparatus for a quick and easy measure of diametral clearance in a bearing without first having to assemble the bearing and pivot into a complete gyro.

According to one aspect of the present invention, the diametral clearance of an aperture of a bearing is measured by apparatus which comprises means for mounting both the bearing and a pivot in axial relation with each other, means for positioning the pivot in adjustable axial relation to the bearing, the means for positioning comprising means for adjusting the pivot in a transverse axial direction to locate an approximate center of clearance of the bearing aperture and for adjusting the pivot from the approximate center of bearing aperture clearance in each of two transverse axial directions in a perpendicular relationship to each other until the pivot displaces the bearing in a transverse axial direction, means for measuring any movement of both the bearing and pivot in a transverse axial direction, and indicating means for indicating any transverse axial movement of either the bearing and pivot while the means for positioning the pivot adjusts the pivot in each of the two transverse axial directions.

According to a second aspect of the present invention, a method of measuring the diametral clearance of an aperture of a bearing comprises the steps of mounting both the bearing and an associated pivot in axial relation to each other, positioning the pivot in adjustable axial relation to the bearing for adjusting the pivot in a transverse axial direction to locate an approximate center of clearance of the bearing aperture and for adjusting the pivot from the approximate center of bearing aperture clearance in each of two transverse axial directions in a perpendicular relationship to each other until the pivot displaces the bearing in a transverse axial direction, measuring any movement of both the bearing and pivot in a transverse axial direction, and indicating any transverse axial movement of either the bearing and pivot.

The present invention represents a dramatic improvement in measuring the diametral clearance of a gyro suspension bearing in that the individual bearing and pivot do not have to be assembled into a gyro to be tested. This overcomes the shortcomings of the prior art in which the bearing and pivot were tested only after being assembled into a complete gyro. The present invention thus represents a significant reduction in time and expense over the prior art in determining the tolerance suitability of a bearing/pivot pair. However, as described herein, the present invention is not limited to use with gyro suspension bearings; it may be used with any type of bearing, including gas bearings, where a need exists to quickly and accurately determine the clearance of a bearing aperture.

The foregoing and other objects, features and advantages of the present invention will become more apparent in light of the following detailed description of an exemplary embodiment thereof, as illustrated in the accompanying drawings.

BEST MODE FOR CARRYING OUT THE INVENTION

Figure 1:
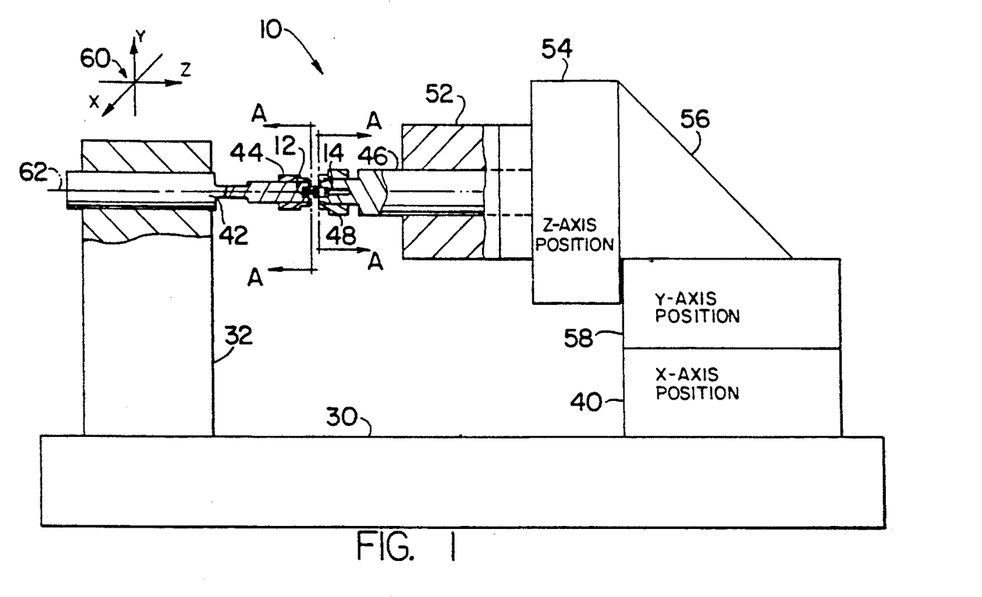
FIG. 1 is front view of apparatus according to one aspect of the present invention.

Referring to FIG. 1, apparatus 10 for measuring diametral clearance in a bearing 12 is illustrated. The bearing 12 may be a precision gyro suspension bearing of the type illustrated in FIG. 2, and used in high accuracy, precision gyros, e.g., a Hamilton Standard Model RI-1010 gyro. The bearing has a pivot 14 associated therewith, the pivot 14 being illustrated in more detail in FIG. 4.

Figure 2:
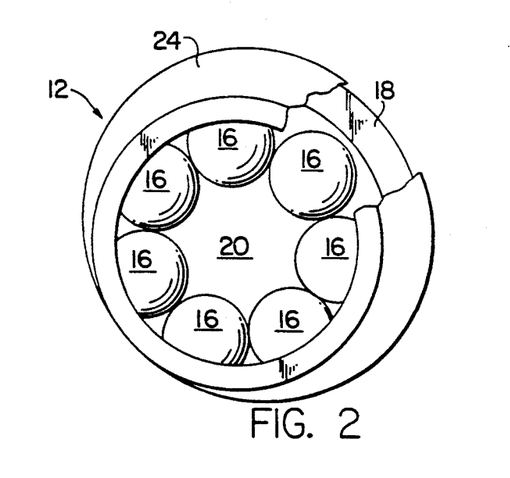
FIG. 2 is a perspective view, partially cut away, of a portion of a bearing to be tested by the present invention.

In FIG. 2 is illustrated a perspective view of the exemplary bearing 12 of FIG. 1 as comprising a set of ball bearings 16 confined within a cylindrical outer race 18. The diameter of the outer race 18 is selected to hold the ball bearings 16 in a concentric circular formation, thereby forming a cylindrical aperture 20 in the center of the bearing 12 and concentric to the outer race 18.

Figure 3:
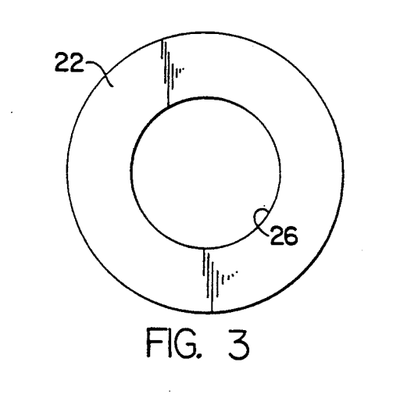
FIG. 3 is a perspective view of another portion of the bearing of FIG. 2.

Referring also to FIG. 3, the ball bearings 16 are retained in the outer race 18 by a pair of end plates 22, an exemplary one of which is shown apart from the bearing of FIG. 2. Each end plate 22 comprises a thin, resilient layer of retaining material, such as sapphire, held in relation to the outer race 18 by a bearing housing 24. The end plate 22 is circular in shape and has an outer diameter equal to the diameter of the outer race 18. The end plate 22 also has a concentric circular aperture 26 slightly larger in diameter than the aperture 20 created by the ball bearings 16 in the center of the bearing 12. The bearing housing 24 is cylindrical in shape and in concentric relation to the bearing outer race 18. The inside diameter of the housing 24 is slightly larger than the outside diameter of the outer race 18 so that friction therebetween is sufficient to prevent relative motion between the outer race 18 and housing 24.

Figure 4:
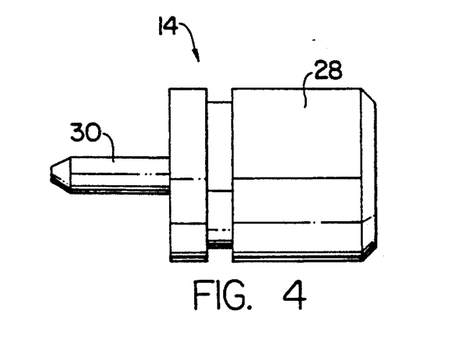
FIG. 4 is view of a pivot which mates with the bearing of FIG. 2.

In FIG. 4 is illustrated the pivot 14 associated with the bearing 12, the pivot 14 comprising a body 28 and stem 30. When assembled into the gyro, the stem 30 is inserted into the cylindrical aperture 20 in the center of the bearing 12. In the Hamilton Standard gyro described hereinbefore, the pivot 14 and bearing 12 form an integral suspension assembly within the gyro. For proper gyro operation it is important that the cylindrical aperture 20 in the bearing 12 provide proper diametral clearance for a precise fit of the pivot stem 30 therein. However, due to the relatively small size of the bearing 12 and pivot 14, measuring this diametral clearance of the individual bearing 12 to the required accuracy before gyro assembly has heretofore been impossible.

Referring again to FIG. 1, the apparatus 10 of the present invention is illustrated as comprising a test stand-like configuration in which the diametral clearance of a bearing is determined in a quick and easy manner. The apparatus comprises a number of components, described in detail hereinafter, which are machined from, e.g., 300 series corrosion-resistant CRES stainless steel. It is to be understood, however, that these components may be made from any other suitable material. The apparatus also comprises a number of "off-the-shelf" components purchased from vendors, also described in detail hereinafter.

Figure 5:
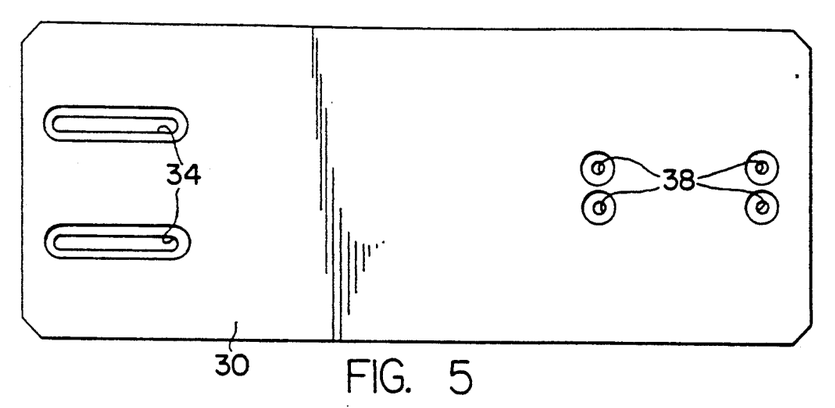
FIGS. 5-11 are views of components comprising the apparatus of FIG. 1.
Figure 6A:
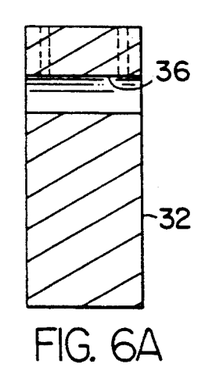
Figure 6B:
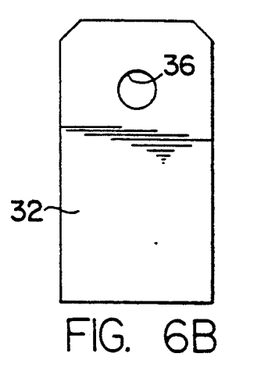

Specifically, in FIG. 1 is illustrated a base 31 to which a mounting block 32 is attached. A top view of the base 31 is illustrated in FIG. 5, while front and side views of the block 32 are illustrated in FIGS. 6(A) and 6(B), respectively. The base 31 has machined therein a pair of slots 34 which accommodate mounting screws (not shown) that secure the block to the base 31. The block 32 also has a hole 36 bored therethrough. The base 31 has a number of holes 38 bored therethrough in which screws (not shown) are used to secure an X-axis positioning device 40 to the base 31. The X-axis positioning device 40 is described in detail hereinafter.

Figure 7:
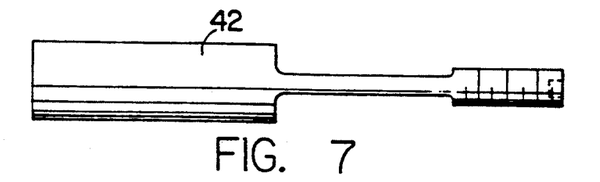
Figure 8:
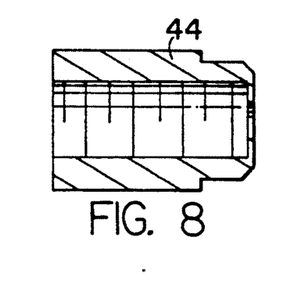

A bearing mounting rod 42, illustrated in more detail in FIG. 7, inserts into the hole 36 in the mounting block 32. The bearing 12 to be tested fits into a cavity at one end of the rod 42. A bearing chuck 44, illustrated in detail in FIG. 8, fits over the bearing 12 and a portion of the rod 42 and holds the bearing securely in place in the rod.

Figure 9:
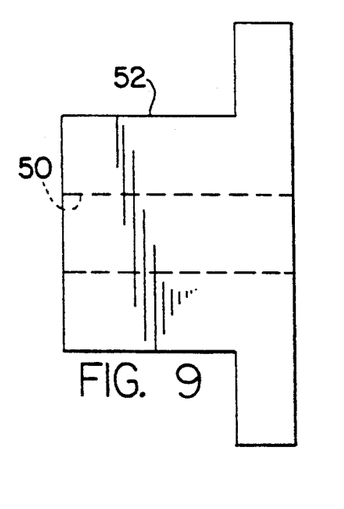
Figure 10:
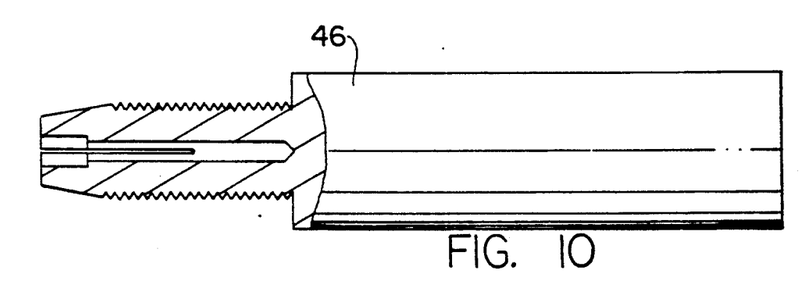
Figure 11:
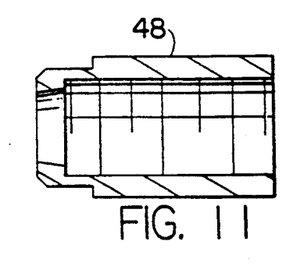

The associated pivot 14 is inserted into a collet 46, illustrated in more detail in FIG. 10. A pivot chuck 48, illustrated in FIG. 11 and similar to that of FIG. 8, fits over the pivot 14 and a portion of the collet 46 and holds the pivot 14 securely in place in the collet 46. The collet 46 inserts into a hole 50 bored through a mounting block 52, illustrated in more detail in a top view in FIG. 9. When assembled, the apparatus 10 of FIG. 1, comprising in part the components of FIGS. 5-11, holds the bearing 12 and pivot 14 in precise and adjustable axial alignment.

Referring again to FIG. 1, the mounting block 52 for the pivot collet 46 is secured to a Z-axis positioning device 54. The Z-axis positioning device 54 secures to a right-angle block 56, which secures to a Y-axis positioning device 58, which in turn secures to the X-axis positioning device 40. The positioning devices 40,54,58 and block 56 are all secured by, e.g., screws. Each of the X-Y-Z positioning devices 40,54,58 are identical those provided with the Model PI-3 PIEZO-FINE Positioning System supplied by Power Technolo Inc., Little Rock, Ark. The positioning devices 40,54,58 comprise a piezoelectric micrometer which allows for both a coarse manual micrometer adjustment (e.g., 10 microns) and a fine piezoelectric adjustment (e.g., better than 0.05 microns) of the element to be positioned. The fine positioning is superimposed on the coarse positioning. A positioning system 76 is described hereinafter with respect to FIG. 13.

In the apparatus of the present invention, the element to be adjusted is the pivot 14. By incorporating three positioning devices 40,54,58 along the three axes of a rectangular coordinate system, the pivot 14 can be adjusted in each of the X, Y and Z directions relative to the bearing 12. The relationship of the X-Y-Z axes to the apparatus is illustrated in FIG. 1 by the rectangular coordinate system 60. Adjustment of the pivot position to determine bearing clearance in accordance with the present invention is described in detail hereinafter.

Figure 12:
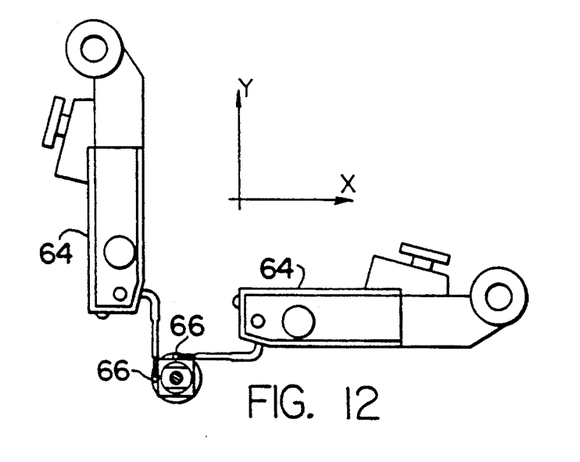
FIG. 12 is a view of bearing clearance measuring apparatus which coacts with the apparatus of FIG. 1.

Any movement of either the bearing 12 or pivot 14 in a transverse direction to an axis of alignment 62 of the pivot 14 and bearing 12 is detected by gaging devices 64 of the LVDT type illustrated in FIG. 12 and provided by Sheffield Measurement, Dayton, Ohio. For simplicity, the gaging devices 64 are not illustrated in FIG. 1. These gaging devices may comprise, in part, the Model T-235 gage head provided by Sheffield Measurement, which is capable of 1 microinch movement sensing resolution and proportional signal output with low electrical noise. It is to be understood, however, that the LVDT-type devices are simply exemplary; other types of movement sensing devices may be used, if desired, e.g., capacitive or laser measurement systems. Their use should be apparent to one of ordinary skill in the art, in light of the teachings herein.

In FIG. 12 is illustrated a pair of the gaging devices 64 mounted in a perpendicular relationship to each other. The view of FIG. 12 is that seen along either of views A—A as indicated in FIG. 1. Thus, there are a total of four of the gaging device 64 used in the apparatus of FIG. 1: one pair measures bearing movement in each of two transverse axial directions perpendicular to one another; a second pair measures pivot movement in each of two transverse axial directions perpendicular to one another, the two directions being aligned identically between the bearing 12 and pivot 14. Each gaging device 64 comprises a sensing tip 66 which is held in position so as to be placed in contact with the associated pivot or bearing chuck 44,48. Although not illustrated in FIGS. 1, 12, or 13, the gaging devices may be held in position relative to the bearing and pivot chucks 44, 48 by gage stands, e.g., the Model S-1308 provided by Sheffield Measurement. The sensing tip 66 senses any small movement of the corresponding chuck and therefore any movement of the pivot 14 or bearing 12.

Figure 13:
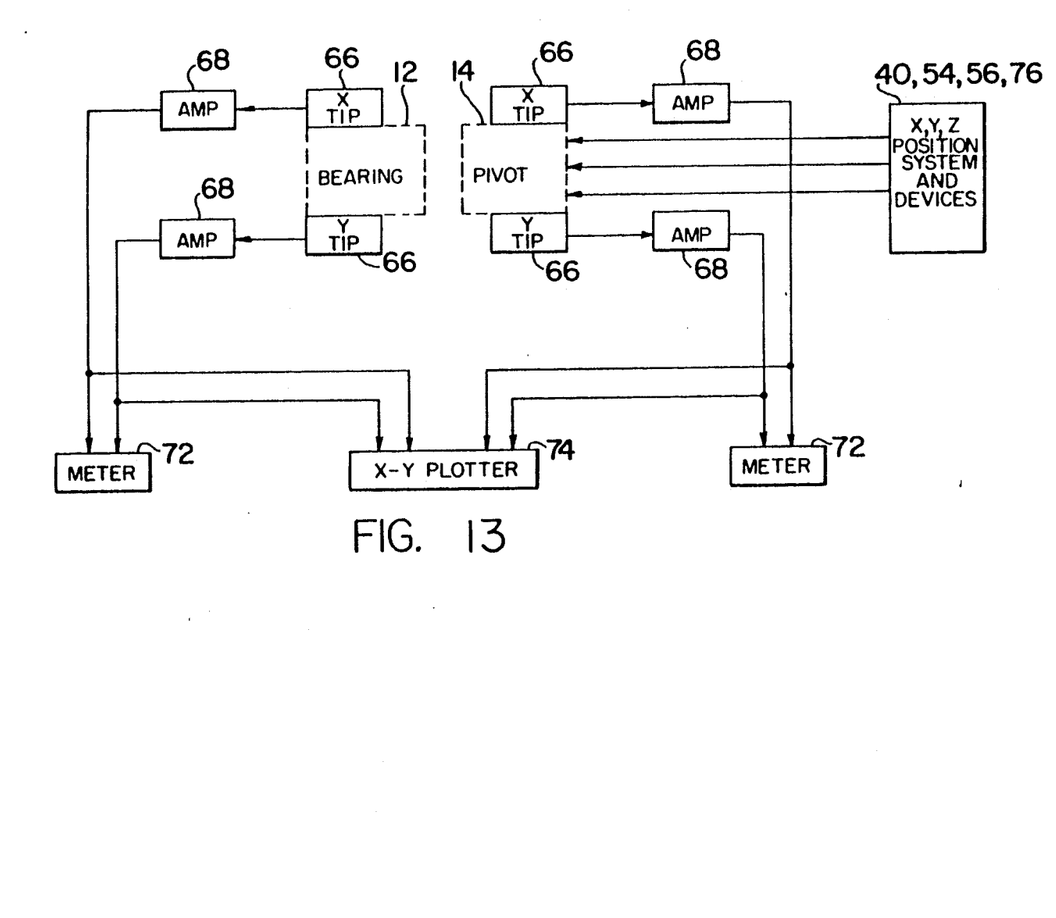
FIG. 13 is an electrical block diagram of the apparatus of FIGS. 1 and 12.

FIG. 13 is an electrical block diagram of the apparatus of FIG. 1. Any bearing and/or pivot movement detected by one of the four sensing tips 66 is fed as an electrical signal to a corresponding amplifier 68. Each of the amplifiers 68 may be identical to the Model BX-8 Dual Input Amplifier provided by Sheffield Measurement, and is made to interface with the Model T-235 gage heads.

The output of the amplifiers 68 is provided to a pair of deflection meters 72; one for the bearing amplifiers and one for the pivot amplifiers. The meters 72 indicate any movement of the bearing 12 and/or pivot 14 sensed by the gage heads gaging devices 64. For convenience, the meters 72 are integrated into the cabinet of the aforementioned Model BX-8 Amplifier. The amplifier outputs are also fed to, e.g., an X-Y plotter 74, for plotting on graph paper the bearing clearance as determined by the present invention. However, it is to be understood that the measured bearing clearance may be indicated to an operator, if desired, by other means, such as a video display.

Also illustrated in FIG. 13 is the positioning system 76 for the X-Y-Z positioning devices 40,54,58. As described hereinbefore with respect to FIG. 1, the positioning devices 40,54,58 have both a piezoelectric fine adjustment and a manual coarse adjustment. The coarse adjustment is made by manually rotating a micrometer shaft of any of the X-Y-Z positioning devices 40,54,58.

The fine adjustment is made by the positioning system 76 which comprises, for each of the X-Y-Z positioning devices 40,54,58, a potentiometer (not shown) which is manually adjusted for precise adjustment of pivot position. The potentiometers adjust the voltage to the corresponding piezoelectric element within the micrometer device. The positioning system 76 may comprise one identical to, e.g., the Model PI-3 provided by Power Technology, Inc., Little Rock, Ark.

The operation of the invention is best understood by example. The apparatus 10 of FIG. 1 is configured as illustrated therein. The base 31 may be set on a table (not shown) which is isolated from ground to reduce or dampen any effect of vibration on the measurement of bearing clearance. The base 31 may be mounted normal to the table to eliminate gravity effects; however, in this application it is not necessary.

The axial alignment of the holes 36,50 bored through the bearing and pivot mounting blocks 32,52 is checked by inserting an alignment rod (not shown) in the holes 36,50 and finger checking for any pressure exerted on the rod due to the blocks being out of alignment. This alignment is only an initial coarse adjustment and will be fine tuned at time of pivot insertion. The rod may merely comprise a cylindrical rod machined from the same 300 series CRES stainless steel. Any misalignment of the axis of alignment 62 may be corrected by appropriate adjustment of the X and/or Y positioning devices 40,58. This axial alignment need only be checked once, typically at the beginning of the bearing measurement session. If desired, the axial alignment may be checked by any other known method, such as by laser.

The bearing 12 and pivot 14 to be tested are initially checked visually for any contaminants using appropriate magnification devices as necessary. Then the bearing 12 and pivot 14 are inserted into the bearing mounting rod 42 and pivot collet 46, respectively. The rod 42 and collet 46 in turn, are inserted into the corresponding mounting block. The bearing chuck 44 is then fitted over the bearing 12 and a portion of the rod 42 to hold the bearing 12 securely in place. Likewise, the pivot chuck 48 is then fitted over the pivot 14 and a portion of the collet 46 to hold the pivot securely in place.

Next, the gaging devices 64 are moved into position in relation to the bearing and pivot chucks 44,48. Note that in FIG. 12 is illustrated the pair of gaging devices 64 in a perpendicular relationship, with one gaging device 64 oriented horizontally and the other gaging device 64 oriented vertically. However, the gaging device 64 need not be oriented in such a horizontal/vertical manner; it suffices only that the gaging device 64 be oriented in a perpendicular relationship without being constrained to an additional horizontal/vertical orientation.

Using the positioning devices 40,54,58 (primarily the Z-positioning device 54), the pivot stem 30 is then inserted into the cylindrical aperture 20 of the bearing. For the particular bearing/pivot pair utilized in the aforementioned Hamilton Standard gyro, the pivot stem insertion is complete when the gap, as determined visually, between the bearing front sapphire endplate and pivot body 28 is approximately 0.015–0.030 inches. As the pivot stem 30 is being inserted into the bearing 12, the X and Y positioning devices 40,58 are adjusted to limit bearing displacement to 100 microinches, as indicated on the meters 72.

Once the pivot stem 30 is properly inserted, the X and/or Y positioning devices 40,58 are adjusted to locate the approximate center of clearance of the bearing cylindrical aperture 20 in both the X and Y directions. This is determined by monitoring the corresponding meter while the devices are adjusted and then visually observing the point on the meters where the center occurs.

Next, with the pivot 14 approximately positioned in the center of the bearing clearance, the X and Y positioning devices 40,58 are adjusted, in turn, through a range of travel to locate the boundaries of the bearing cylindrical aperture 20 in either or both of the X and Y directions. The boundaries are easiest seen by plotting on the X-Y plotter 74 an X-Y graph of: (A) pivot 14 movement in the X direction on the abscissa, as directed by the X axis positioning device 40; versus (B) resulting X axis movement of the bearing 12 on the ordinate, as measured by the X axis gaging device 64; and then plotting on the same X-Y graph (C) pivot 14 movement in the Y direction on the abscissa, as directed by the Y axis positioning device 58; versus (D) resulting Y axis movement of the bearing 12 on the ordinate, as measured by the Y axis gaging device 64.

Figure 14:
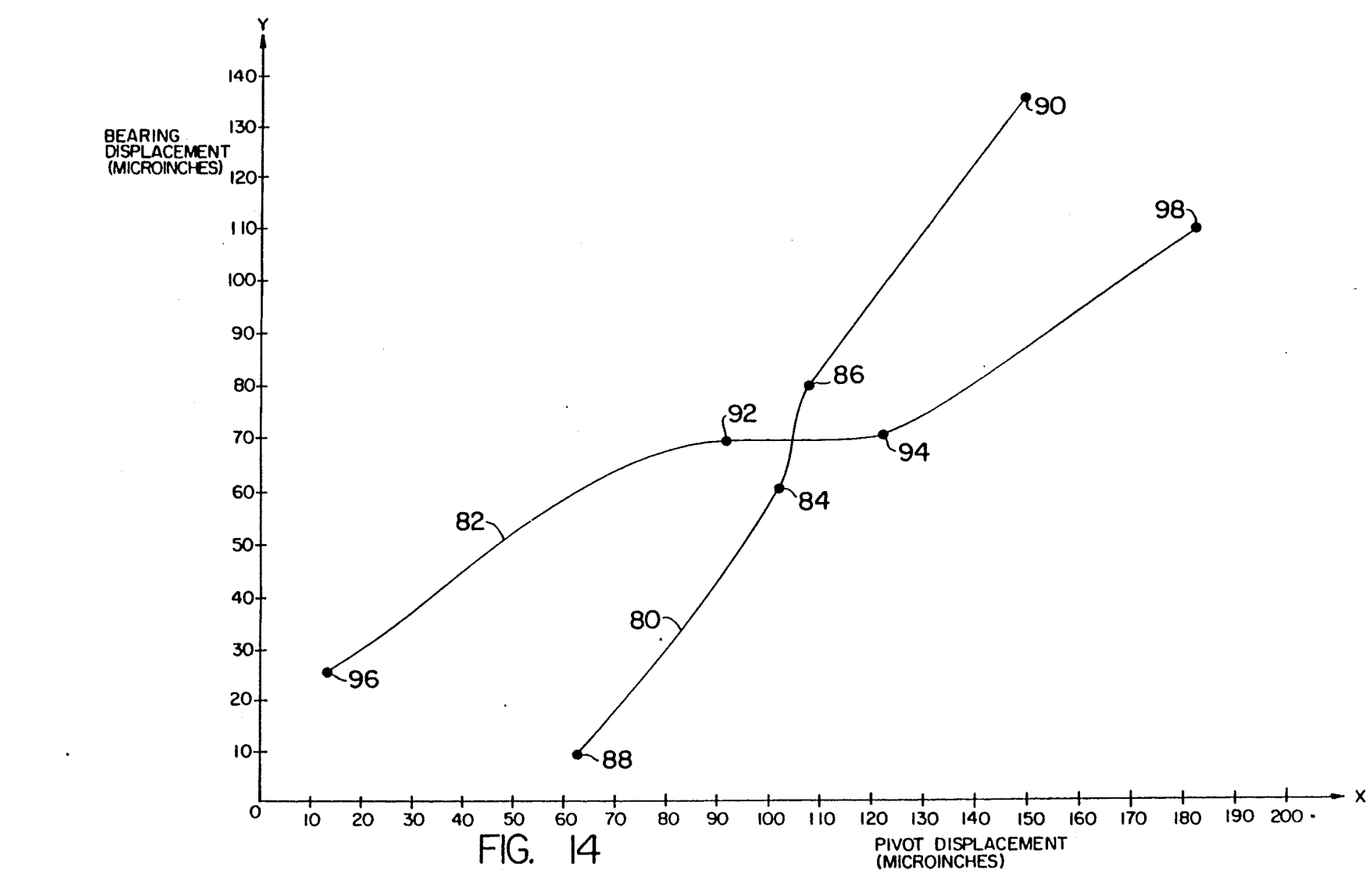
FIG. 14 is a graph of pivot versus bearing movement which indicates bearing clearance as determined in accordance with the present invention.

In FIG. 14 is illustrated a graph of pivot displacement on the abscissa versus bearing displacement on the ordinate. Two resulting plotted lines 80,82 are indicated on the graph. A first line 80 is indicative of pivot movement in the X direction and resulting bearing movement in the X direction. The bearing clearance in the X direction is indicated as the vertical region on the plotted line between the two points 84,86.

On either side of these two points 84,86 the plotted line starts to decrease and increase, respectively, in a horizontal direction towards the end points 88,90. This is indicative of bearing movement, which, in turn, is indicative of the fact that the pivot stem 30 has reached an edge of the bearing cylindrical aperture 20 and is now displacing the bearing 12 in the X direction (i.e., the bearing mounting rod 42 is bending in a transverse axial direction). Thus, bearing clearance in the X direction is, for the graph of FIG. 14, approximately 20 microinches.

Next, the Y positioning device 58 is adjusted and the second plotted line 82 on the graph of FIG. 14 is indicative of pivot versus bearing movement in the Y direction. The resulting bearing center of clearance in the Y direction is approximately 30 microinches, as indicated by the approximately horizontal region on the second plotted line between the two points 92,94. On either side of these two points 92,94 the second plotted line 82 starts to decrease and increase, respectively, in a horizontal direction towards the end points 96,98. This is indicative of bearing movement, which, in turn, is indicative of the fact that the pivot stem 30 has reached an edge of the bearing cylindrical aperture 20 and is now displacing the bearing 12 in the Y direction.

The graph of FIG. 14 indicates an acceptable bearing due to the measured bearing clearance. However, a graph similar to the one in FIG. 14 would indicate a defective bearing by a large bearing clearance. As an alternative, the graph may indicate a defective bearing or pivot by a bearing clearance having a large asymmetry. Using a graph similar to that of FIG. 14, the present invention provides a quick and easy determination of acceptable bearing clearance without having to first assemble the bearing 12 and pivot 14 into a gyro—a time consuming and costly procedure.

If desired, the bearing displacement as measured by the present invention and indicated on the vertical axis may be converted to bending force (i.e., load on the bearing) if the stiffness of the bearing mounting shaft is known. The force is given by the following equation:

$$F = (3 * S * E * I)/L^3 \qquad \text{Equ. 1}$$

where:
S equals measured bearing displacement in the transverse axial direction;
E equals the modulus of the material from which the bearing mounting rod is made (e.g., 300 series CRES);
I equals the area moment of inertia, and
L equals the length of the bending rod.

The invention has been described for use with a particular type of bearing 12. However, it is to be understood that other types of bearings may be used without departing from the spirit of the present invention. For example, in the aforementioned Hamilton Standard gyro, a gas bearing is utilized. Also, gyro bearings having a spring-loaded endstone to limit axial play are also in this gyro. These other bearings may also be tested for bearing clearance using the method and apparatus of the present invention. These other bearings may require, however, components for holding the bearings in precise axial alignment which are different than those specified herein. However, the use of other components should be obvious to one of ordinary skill in the art, in light of the teachings herein.

Also, the invention is illustrated as using specific apparatus for positioning the pivot and measuring any pivot or bearing movement. However, the apparatus disclosed is purely exemplary; any other suitable apparatus may be used without departing from the spirit and scope of the present invention, in light of the teachings herein.

Further, the apparatus according to one aspect of the present invention has been described as comprising components having specific shape and physical features. However, it is to be understood that various alternative component designs may be employed without departing from the spirit and scope of the present invention. It suffices for the broadest scope of the invention that the diametral clearance of a bearing aperture is measured by apparatus which comprises means for mounting both the bearing and a pivot in axial relation to each other, means for positioning the pivot in relation to the bearing, the means for positioning the pivot comprising means for adjusting the pivot in a transverse axial direction to locate an approximate center of bearing aperture clearance and for adjusting the pivot from the approximate center of bearing aperture clearance in each of two transverse axial directions in a perpendicular relationship to each other until the pivot displaces the bearing in a transverse axial direction, means for measuring any movement of both the bearing and pivot in a transverse axial direction, and indicating means for indicating any transverse axial movement of either the bearing and pivot.

Although the invention has been shown and described with respect to an exemplary embodiment thereof, it should be understood by those skilled in the art that various changes, omissions and additions may be made therein and thereto, without departing from the spirit and scope of the present invention.

I claim:

1. Apparatus for measuring the diametral clearance of an aperture in a bearing, comprising:
   means for mounting both the bearing and a pivot in axial relation with each other along an axis of alignment;
   means for positioning the pivot in adjustable axial relation to the bearing, the means for positioning the pivot comprising means for adjusting the pivot in each of two mutually perpendicular axial directions transverse to said axis of alignment, as required, to locate an approximate center of clearance of the bearing aperture and for adjusting the pivot from said approximate center of bearing aperture clearance in each of said mutually perpendicular axial directions until the pivot displaces the bearing in said corresponding axial direction, said pivot displacement of the bearing in said corresponding axial direction being indicative of an outer edge of the bearing aperture;
   means for measuring any movement of both the bearing and the pivot in each of said mutually perpendicular axial directions; and
   indicating means, for indicating any transverse axial movement of the bearing and pivot while said means for positioning the pivot adjusts the pivot in each of said two mutually perpendicular axial directions.

2. The apparatus of claim 1, wherein said indicating means comprises means for graphically indicating a graph of pivot position as adjusted by said means for positioning the pivot versus corresponding bearing position as measured by said means for measuring.

3. The apparatus of claim 1, wherein said indicating means comprises an X-Y plotter.

4. The apparatus of claim 1, wherein said means for positioning the pivot comprises means for manually adjusting the position of the pivot in a relatively coarse adjustment, and means for piezoelectrically adjusting the position of the pivot in a fine adjustment relative to said coarse adjustment.

5. The apparatus of claim 1, wherein said means for measuring is placed in physical contact with said means for mounting both the bearing and the pivot in axial relation with each other.

6. The apparatus of claim 1, wherein said means for mounting comprises:
   a bearing mounting rod having a cavity at one end for receiving the bearing therein;
   a pivot collet having a cavity at one end for receiving the pivot therein;
   a bearing mounting block having an opening formed therethrough for receiving the bearing mounting rod therein;
   a pivot mounting block having an opening formed therethrough for receiving the pivot collet, wherein the bearing mounting block and the pivot mounting block hold the rod and the collet respectively so as to position the bearing and the pivot in adjustable axial alignment;
   a bearing chuck having an opening formed therein for receiving the bearing and a portion of the bearing mounting rod therein so as to hold the bearing securely in place in the rod; and
   a pivot chuck having an opening formed therein for receiving the pivot and a portion of the pivot collet therein so as to hold the pivot securely in place in the collet.

7. A method of measuring the diametral clearance of an aperture of a bearing, comprising the steps of:
   mounting both the bearing and an associated pivot in axial relation with each other along an axis of alignment;
   positioning the pivot in axial relation to the bearing for adjusting the pivot in each of two mutually perpendicular axial directions to said axis of alignment to locate an approximate center of clearance of the bearing aperture and for adjusting the pivot from the approximate center of bearing clearance in each of said mutually perpendicular axial directions until the pivot displaces the bearing in said corresponding axial direction;
   measuring any movement of both the bearing and the pivot in each of said mutually perpendicular axial directions; and
   indicating any transverse axial movement of the bearing and the pivot.

8. The method of claim 7, wherein said step of indicating comprises the step of graphically indicating a graph of pivot position as adjusted by said step of positioning the pivot versus corresponding bearing position as measured by said step of measuring.

9. The method of claim 7, wherein said step of indicating any transverse axial movement comprises the step of indicating any transverse axial movement on an X-Y plotter.

10. The method of claim 7, wherein said step of positioning the pivot comprises the steps of manually adjusting the position of the pivot in a relatively coarse adjustment, and piezoelectrically adjusting the position of the pivot in a fine adjustment relative to said coarse adjustment.

11. The method of claim 7, wherein said step of measuring comprises the step of physically contacting the bearing and pivot with measuring means to measure any movement of both the bearing and pivot in a transverse axial direction.

12. The method of claim 7, wherein said step of mounting both the bearing and the associated pivot in axial relation with each other comprises the steps of:
   inserting the bearing into a bearing mounting rod;
   inserting the pivot into a pivot collet;
   inserting the bearing mounting rod into a bearing mounting block;
   inserting the pivot collet into a pivot mounting block, wherein the bearing mounting block and the pivot mounting block hold the rod and the collet respectively so as to position the bearing and the pivot in adjustable axial alignment;
   fitting a bearing chuck over the bearing and a portion of the bearing mounting rod for holding the bearing securely in place in
   fitting a pivot chuck over the pivot and a portion of the pivot collet for holding the pivot securely in place in the collet.

* * * * *